E. D. CURTIS.
Grain-Drill.
No. 13,781
Patented Nov 13, 1855.
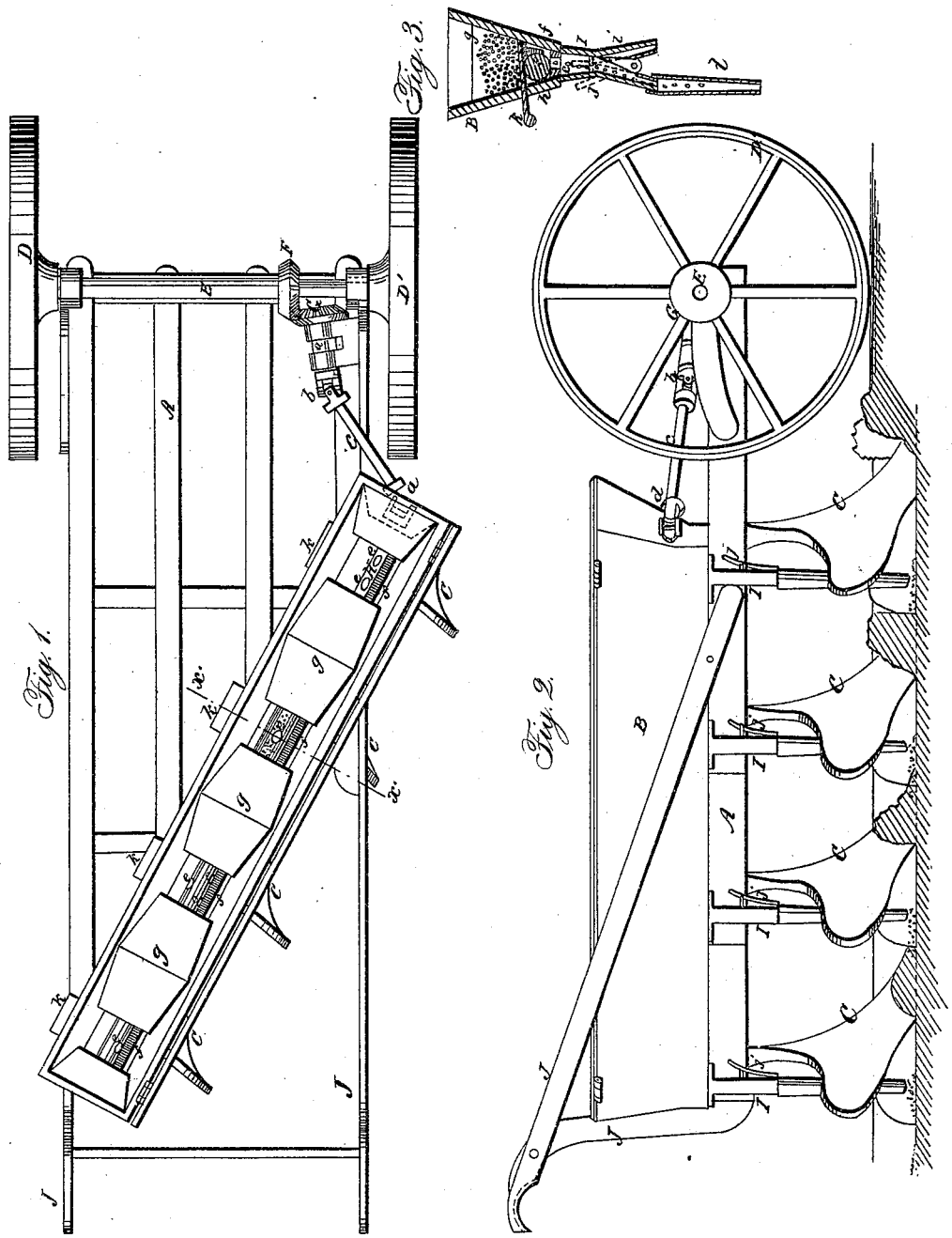

UNITED STATES PATENT OFFICE.

E. D. CURTIS, OF MOUNT MORRIS, NEW YORK.

IMPROVEMENT IN SEEDING-MACHINES.

Specification forming part of Letters Patent No. 13,781, dated November 13, 1855.

*To all whom it may concern:*

Be it known that I, E. DARWIN CURTIS, of Mount Morris, in the county of Livingston and State of New York, have invented a new and useful improvement in the distributing-tube arrangements of seed - planting machines for sowing seed in drills and broadcast, of which the following is a full, clear, and exact description, reference being had to the accompanying drawings, which form part of this specification, and in which—

Figure 1 represents a plan or top view of a seed-planter to which my improvement is attached, but not seen in this figure; Fig. 2, a side view of the planter; and Fig. 3, a transverse section of the hopper distributing-shaft, and showing in vertical section one of the distributing-tubes with my improvement applied thereto, *x x*, Fig. 1, indicating the line of section.

My improvement has reference to that description of the distributing-tube arrangements of seed-planting machines in which the distributing-tubes are made with branches or forks at their lower ends for the better distribution and scattering of the seed; and my invention consists in a novel construction and arrangement of a valve-partition in said tube for insuring a free and easy discharge from one or both of the forks at pleasure, the other parts of the machine and its general arrangement and operation not being here claimed as new, but being minutely described in illustration of the particular kind of machine to which I have applied my improvement.

A represents a frame the front end of which is at right angles with the sides, and the back is made obliquely with the sides.

B represents the hopper, which is attached to the back end of the frame A and obliquely with its sides, forming an angle of about thirty degrees with the sides of the frame A, as shown in Fig. 1.

To the back end of the frame A, and underneath the hopper B, there are attached a series of shares, C, of the usual plow form. These shares are so placed that one is in advance of the other, and the furrow made by the foremost share is filled by the one immediately behind it, and so on with all the others, so that the entire number of furrows are made and refilled by the shares as the implement is drawn along.

To the front end of the frame A there are attached two wheels, D D', which are secured to an axle, E, which runs across the upper surface of the frame. On this axle E there is placed a bevel-pinion, F, which gears into a corresponding pinion, G, attached to a small shaft, *a*, on the frame A. The inner end of the shaft *a* is connected by a universal joint, *b*, to a shaft, *c*, the inner end of which is connected by a universal joint, *d*, to a shaft, H, which passes longitudinally through the hopper B. The shaft H has a series of holes or apertures, *e*, made in it, said holes or apertures being in spiral form around the shaft. To the inner surface of the back part of the hopper there are attached brushes *f*, said brushes being placed between double inclined planes *g* within the hopper, the edges of the brushes bearing against the periphery of the shaft H. (See Figs. 1 and 3.) Holes or apertures *h* (see Fig. 3) are made through the bottom of the hopper B, underneath the shaft H and between the inclined planes *g*.

To the under surface of the hopper, and in line with the holes or apertures *h*, conveying-tubes I are attached. The lower parts of the tubes I are forked, as shown in Fig. 3, and each tube is provided with a valve, *i*, so that either of the branches of the fork may be closed at their point of junction or both be left open.

A tube I is directly over the back part of each share, as shown in Fig. 2, and the valves *i* are provided each with a small handle or lever, *j*, on the outer sides of the tubes.

Through the front side of the hopper small slides *k* are fitted. (See more particularly Fig. 3.) These slides work between the double inclined planes *g* and regulate the amount of seed to be discharged from the hopper.

J J are handles attached to the back end of the frame A.

The seed to be sown is placed in the hopper B, and as the machine is drawn along the pinions F and G and shafts *a c* communicate motion to the shaft H, which, as it rotates, deposits the seed in the tubes I, the seed of course passing into the holes or apertures *e* in the shaft. The brushes *f* prevent any more seed than will just fill the holes *e* from passing down the tubes I, and the slides *k*, by being properly adjusted, regulate the supply of seed to the shaft H or holes *e*. The valves *i* are placed, as shown in red, Fig. 3, so that the seed may pass out of both of the lower prongs of the forks of the tubes and fall into the furrows made by the shares, the furrow made by each share being filled by the share immediately behind it, as before stated.

The seed is sown broadcast in the above manner, but when the seed is to be sown in drills the valve $i$ is turned so as to close one of the prongs of each tube, and an additional tube, $l$, is attached to the open prongs of the tubes I, the tubes $l$ conveying the seed into the several furrows.

The valve $i$, it will be observed, is of wedge form and single-flap construction, presenting a knife or vanishing edge at its upper end and gradually thickening toward its base or lower end, where it is hinged or pivoted, so that when set vertical, as represented by red lines in Fig. 3, its two sides form straight continuations of the two forks of the distributing-tube I, and nothing more than a knife-edge obstruction at the point where the division commences, and its base fills up the space separating the forks, whereby neither the valve at its upper edge nor the forks at their root interfere with the free and easy run of the seed from the distributing-tube equally down or to the angular branches or forks, and no surface is presented for lodgment or choking of the seed; and when the said valve is set to one side, as shown in black lines, Fig. 3, for confining the discharge to one of the forks, the upper knife-edge of the valve and wedge form of its body alike prevent lodgment of seed either on the valve or root of the forks and give a gradually-contracting entrance or run for the seed from the distributing-tube to the open fork, thus insuring as free a delivery when planting in drills as if the distributing-tube were made without forks and had no valve, the use of which in sowing broadcast has already been explained. This arrangement, it will be seen, is totally different both as regards the purpose and manner of operation to those distributing-tube devices which have been provided with a double flap-valve opened and closed at regular intervals to collect a body of seed and suddenly discharge it.

I do not claim the distributing-tube made with forks or branches for the better distribution of the seed in sowing broadcast, as such has before been done; nor yet of itself, or irrespective of its construction, arrangement, and operation, substantially as specified, the combination of a leaf or flap valve with a distributing-tube for governing the discharge of the seed; but What I do claim as new and useful, and desire to secure by Letters Patent, is—

Providing the forked distributing-tube with a wedge-shaped flap-valve, $i$, arranged in relation to the forks as and for operation in the manner and for the purposes substantially as specified.

In testimony whereof I have hereunto subscribed my name.

E. DARWIN CURTIS.

Witnesses:
  JOHN C. FISH,
  W. HAYDEN CURTISS.